United States Patent
Thompson et al.

(10) Patent No.: US 10,649,001 B2
(45) Date of Patent: May 12, 2020

(54) DUAL CAPACITIVE LINEARIZATION CIRCUIT

(71) Applicant: InvenSense, Inc., San Jose, CA (US)

(72) Inventors: Matthew Julian Thompson, Beaverton, OR (US); Ali Shirvani, Menlo Park, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/198,626

(22) Filed: Nov. 21, 2018

(65) Prior Publication Data

US 2019/0170786 A1 Jun. 6, 2019

Related U.S. Application Data

(63) Continuation-in-part of application No. 15/159,655, filed on May 19, 2016, now Pat. No. 10,139,227.

(51) Int. Cl.
| | | |
|---|---|---|
| *G01P 15/125* | (2006.01) | |
| *G01D 5/241* | (2006.01) | |
| *G01P 15/13* | (2006.01) | |
| *G01D 3/02* | (2006.01) | |
| G01P 15/08 | (2006.01) | |
| G01D 5/24 | (2006.01) | |

(52) U.S. Cl.
CPC ............ *G01P 15/125* (2013.01); *G01D 3/02* (2013.01); *G01D 5/2417* (2013.01); *G01P 15/131* (2013.01); *G01P 15/133* (2013.01); G01D 5/24 (2013.01); G01P 2015/0814 (2013.01)

(58) Field of Classification Search
CPC .... G01P 15/125; G01P 15/133; G01P 15/131; G01D 3/02; G01D 5/2417
See application file for complete search history.

(56) References Cited

U.S. PATENT DOCUMENTS

| | | |
|---|---|---|
| 4,584,885 A | 4/1986 | Cadwell |
| 6,230,566 B1 | 5/2001 | Lee et al. |
| 6,386,032 B1 | 5/2002 | Lemkin et al. |
| 2005/0145030 A1 | 7/2005 | Elliot et al. |

FOREIGN PATENT DOCUMENTS

| | | |
|---|---|---|
| EP | 1677073 A1 | 7/2006 |

OTHER PUBLICATIONS

PCT International Search Report and Written Opinion dated Aug. 9, 2017 in International Application No. PCT/US2017/031830. 15 Pages.

*Primary Examiner* — David Z Huang

(57) ABSTRACT

A MEMS system includes a proof mass, an anchor, an amplifier, first and second sense elements and their corresponding feedback elements. The proof mass moves responsive to a stimulus. The anchor coupled to the proof mass via a spring. The amplifier receives a proof mass signal from the proof mass and amplifies the signal to generate an output signal. The first sense element is connected between the proof mass and a first input signal and the second sense element is connected between the proof mass and a second input signal. The second input signal has a polarity opposite to the first input signal. The first feedback element is connected between the proof mass and the output signal and its charges change responsive to proof mass displacement. The second feedback element is connected between the proof mass and the output signal and its charges change in response to proof mass displacement.

24 Claims, 11 Drawing Sheets

DUAL CAPACITIVE LINEARIZATION CIRCUIT

RELATED APPLICATIONS

The instant application is a continuation in part application, which claims the benefit and priority to the application Ser. No. 15/159,655 that was filed on May 19, 2016, and which is incorporated herein by reference in its entirety.

BACKGROUND

Micro-electrical-mechanical (MEMS) sensors are commonly used in computer devices (including cellphones, tablets, fitness trackers, drones, etc.) to provide one or more environmental conditions to a processor, such as pressure information, acceleration information, rotation information and/or other suitable information. Current state-of-the-art MEMS sensors use variable capacitors (capacitive sensing) as a transduction method between the electrical and mechanical domains of the MEMS sensor converting mechanical displacement into an electrical signal. However, variable capacitors (capacitive sensing) are inherently nonlinear and currently require up to 20 parameters of correction to generate the required linear output. Moreover, a nonlinear response results in poor performance in high g acceleration environment. Furthermore, nonlinearity causes vibration rectification error (VRE), which drives the pressure in the accelerometer cavity.

SUMMARY

Accordingly, it is desirable to provide a capacitive transduction method that produces a linear output eliminating the need for the undesirable signal correction. Moreover, it is desirable to reduce nonlinearity while increasing proof mass travel in a micro-electro-mechanical system (MEMS) including a sensor.

In some embodiments, MEMS system includes a proof mass, an anchor, an amplifier, first and second sense elements and their corresponding feedback elements. The proof mass moves responsive to a stimulus. The anchor coupled to the proof mass via a spring. The amplifier receives a proof mass signal from the proof mass and amplifies the signal to generate an output signal. The first sense element is connected between the proof mass and a first input signal and the second sense element is connected between the proof mass and a second input signal. The second input signal has a polarity opposite to the first input signal. The first feedback element is connected between the proof mass and the output signal and generates a signal responsive to proof mass displacement. The second feedback element is connected between the proof mass and the output signal and generates a signal in response to proof mass displacement.

These and other features and aspects of the concepts described herein may be better understood with reference to the following drawings, description, and appended claims.

DESCRIPTION

Figure 1:
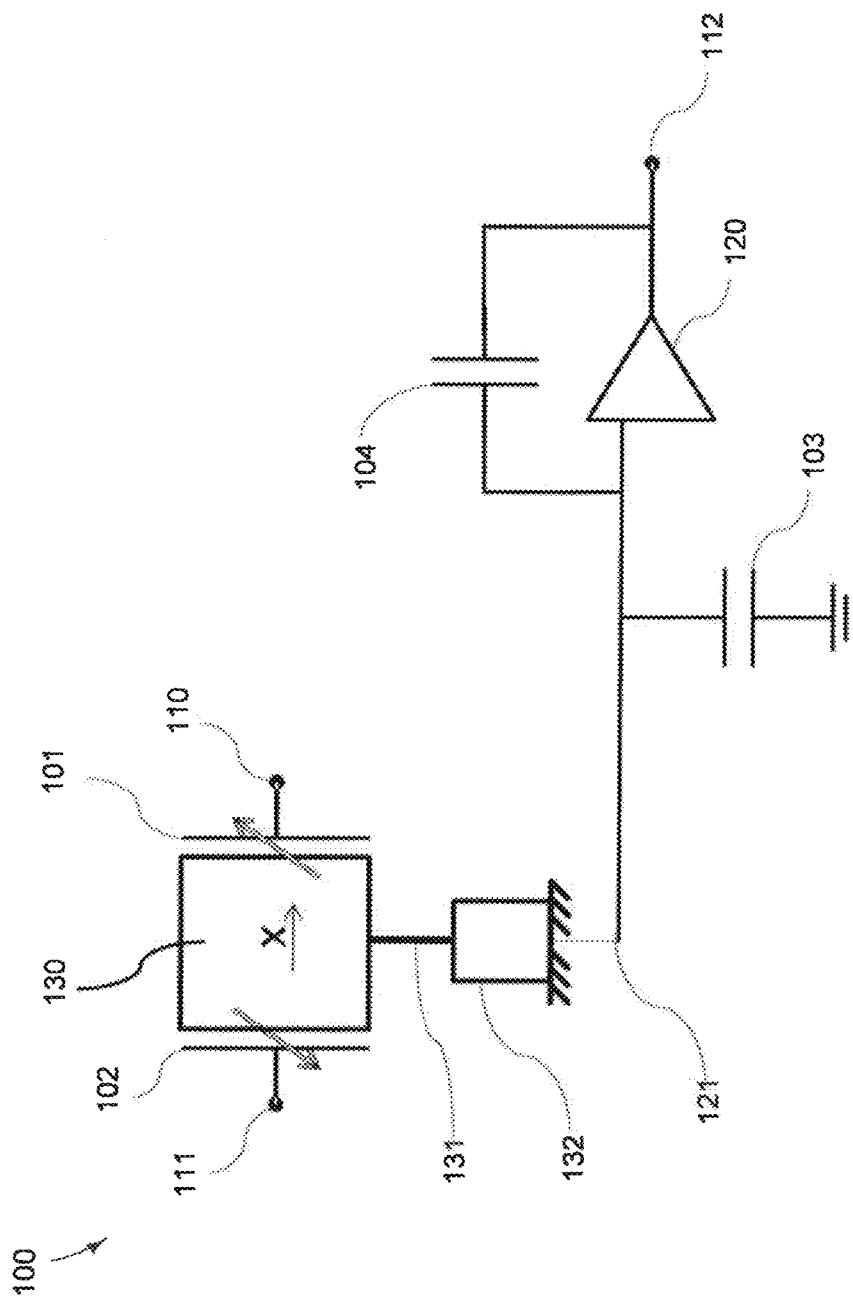
FIG. 1 shows a MEMS sensor with a first sense element and a second sense element, in accordance with some embodiments.

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

In various embodiments, a micro-electric-mechanical system is disclosed. The system includes a proof mass coupled to an anchor via a spring. The proof mass is configured to move in response to one or more environmental stimuli. An amplifier receives a signal from the proof mass, for example, through a wire extending through the spring and the anchor.

The signal is generated in response to the displacement of the proof mass. A sense element is connected between the proof mass and a first input signal and a feedback element is connected between the proof mass and an output signal of the amplifier. One or more electrical features of the proof mass and the sense element (such as capacitance, piezoelectric value, inductance, etc.) increase and/or decrease in response to displacement of the proof mass due to the environmental stimuli. A reference element can be connected between the anchor and a second input signal. The reference element provides the second signal to the amplifier via the anchor.

FIG. 1 illustrates one embodiment of a capacitive MEMS sensor 100. The capacitive MEMS sensor 100 is a micro-electro-mechanical system (MEMS) including a proof mass 130 located between a first sense element 101 and a second sense element 102. It is appreciated that the first sense element 101 and/or the second sense element 102 may be an electrode of a capacitor, a capacitor, a piezoelectric element, piezoresistive element, and/or any other suitable sense element. The proof mass 130 is configured to move between the first sense element 101 and the second sense element 102 in response to one or more external stimuli. For example, in various embodiments, the proof mass 130 is configured to move between the sense elements 101, 102 in response to acceleration, magnetic field, pressure, Coriolis force, acoustic pressure, piezoelectric force, electrostatic force, and/or any other suitable external stimuli or combination thereof. In the illustrated embodiment, the first sense element 101 and the second sense element 102 are arranged in a half-Wheatstone bridge configuration. In some embodiments, the proof mass 130 is coupled to an anchor 132 via a spring 131. The spring 131 maintains a connection between the proof mass 130 and the anchor 132 while allowing the proof mass 130 to move between the sense elements 101, 102.

The first sense element 101 is coupled to a first input 110 and the second sense element 102 is coupled to a second input 111. It will be appreciated that the first input 110 and/or the second input 111 may be a voltage input, a reference voltage, a variable voltage, and/or any other suitable input. The first input 110 and/or the second input 111 can comprise a positive input or a negative input. For example, in some embodiments, the first input 110 is coupled to a positive voltage such that the first sense element 101 defines a positive sense element and the second input 111 is a negative input such that the second sense element 102 defines a negative sense element, although it will be appreciated that other combinations of positive and/or negative sense elements is possible. In some embodiments, the second input 111 is an opposite of the first input 110. An opposite input is an input having the same magnitude (e.g., voltage) but opposite polarity. For example, in some embodiments, the first input 110 can be equal to a positive voltage $V_{in}$ and the second input 111 can be equal to an opposite, negative voltage $-V_{in}$. It is appreciated that in some embodiments, the magnitude of the first input 110 and the second input 111 may be different from one another. In some embodiments, the first sense element 101 and the second sense element 102 can comprise any suitable variable and/or fixed sense element, such as, for example, a capacitor, a piezoelectric element, piezoresistive element, a transistor, and/or any other suitable sense element.

Movement of the proof mass 130 between the first sense element 101 and the second sense element 102 changes one or more electrical properties of the sense elements 101, 102. For example, in some embodiments, movement of the proof mass 130 affects the capacitance of the first and second sense elements 101, 102. A capacitance of a positive sense element ($C_{101}$), for example in embodiments a first sense element 101 coupled to a positive first input 110, is defined by the equation:

$$C_{101} = \frac{\varepsilon_0 A}{g-x} = \frac{\varepsilon_0 A}{g}\left(1 + \frac{x}{g} + \frac{x^2}{g^2} + \frac{x^3}{g^3} + \ldots \right) \quad (1)$$

where g is the initial gap between the proof mass 130 and the first sense element 101, x is the displacement of the proof mass 130, A is the area of the first sense element 101, and $\varepsilon_0$ is permittivity of the space between the proof mass 130 and the first sense element 101. A capacitance of a negative sense element ($C_{102}$), for example, in embodiments a second sense element 102 coupled to a negative second input 111, is defined by the equation:

$$C_{102} = \frac{\varepsilon_0 A}{g+x} = \frac{\varepsilon_0 A}{g}\left(1 - \frac{x}{g} + \frac{x^2}{g^2} - \frac{x^3}{g^3} + \ldots \right) \quad (2)$$

where g is the initial gap between the proof mass 130 and the second sense element 102, x is the displacement of the proof mass 130, A is the area of the second sense element 102, and $\varepsilon_0$ is permittivity of the space between the proof mass 130 and the second sense element 102.

The proof mass 130 is electrically coupled to an amplifier 120. It will be appreciated that the amplifier 120 may be a current amplifier, voltage amplifier, transresistance amplifier, transconductance amplifier, and/or any suitable amplifier type. In some embodiments, the proof mass 130 is electrically coupled to an amplifier 120 by a wire 121. In the illustrated embodiment, the wire 121 extends through the spring 131 and the anchor 132, although it will be appreciated that the proof mass 130 can be coupled to the amplifier 120 by any suitable connection extending through any portion of the capacitive MEMS sensor 100. The wire 121 has a parasitic capacitance represented by capacitor 103. The amplifier 120 is configured to receive a proof mass signal from the proof mass 130. In some embodiments, the amplifier 120 includes a feedback capacitor 104.

The voltage of the output signal 112 is defined based on the difference in capacitance between the first capacitor 101 and the second capacitor 102. For example, in some embodiments, the voltage of the output signal 112 ($V_{112}$) is defined by the equation:

$$V_{112} = \frac{C_{101} - C_{102}}{C_{104}} V_{in} \quad (3)$$

where $C_{104}$ is the capacitance of the feedback capacitor 104. Combining this equation (3) with the equations (1 & 2) for capacitance of the first capacitor 101 ($C_{101}$) and the second capacitor 102 ($C_{102}$) discussed above gives:

$$V_{112} = \frac{1}{C_{104}} \frac{\varepsilon_0 A}{g}\left(\frac{2x}{g} + \frac{2x^3}{g^3} + \frac{2x^5}{g^5} \ldots \right) V_{in} \quad (4)$$

As shown in the above equation (4), the output voltage 112 is a function of the displacement, x. The output signal 112 of the capacitive MEMS sensor 100 is non-linear due to the presence of polynomial terms (such as the $x^3$, $x^5$, ... terms) in the equation. In some embodiments, one of the first sense element 101 or the second sense element 102 can be omitted to generate a linear output 112.

In a MEMS microphone sensor the non-linear terms distort the performance of the sensor at large sound levels. Total harmonic distortion is the measure of how the non-linear terms distort the signal. Reducing or removing the non-linear terms will improve the performance of the MEMS microphone at large sound levels.

Figure 2:
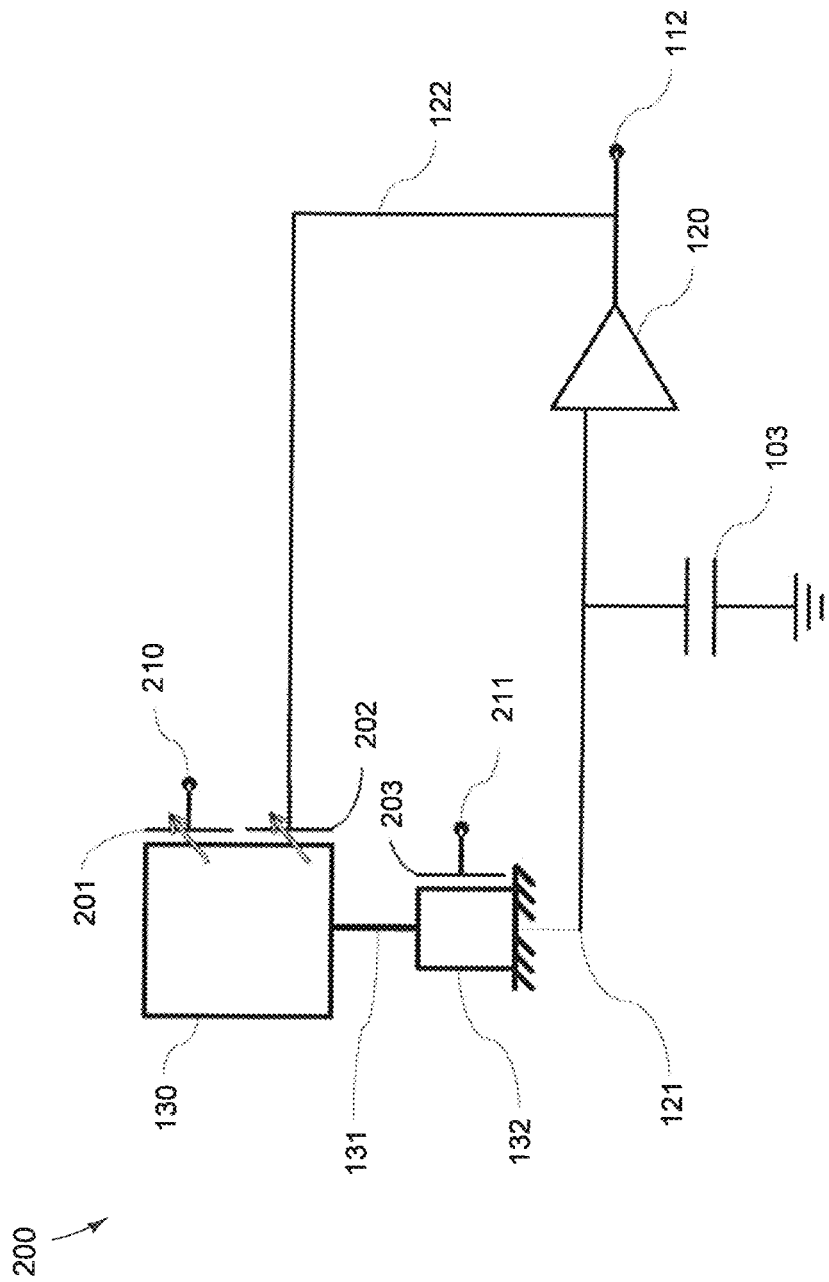
FIG. 2 shows a MEMS sensor with a sense element and a feedback element located on a first side of a proof mass, in accordance with some embodiments.

FIG. 2 illustrates one embodiment of a capacitive MEMS sensor 200 including a sense element 201 and a feedback element 202, both located on a first side of the proof mass 130. It will be appreciated that the sense element 201 and/or the feedback element 202 may be an electrode of a capacitor, a capacitor, a piezoelectric element, piezoresistive element, and/or any other suitable sense element. The first sense element 101 illustrated in FIG. 1 is effectively divided between the sense element 201 and the feedback element 202. The second sense element 102 is omitted. Displacement of the proof mass 130 changes one or more electrical parameters, such as capacitance, of both the sense element 201 and the feedback element 202 in unison. In some embodiments, the sense element 201 and the feedback element 202 are positioned such that the gap between the sense element 201 and the proof mass 130 is equal to the gap between the feedback element 202 and the proof mass 130 such that the one or more electrical parameters of the sense element 201 and the feedback element 202 change equally and in the same direction in response to displacement of the proof mass 130. For example, in some embodiments, the sense element 201 and the feedback element 202 are capacitive elements that equally increase and/or decrease capacitance in response the movement of the proof mass 130. In some embodiments, the sense element 201 and the feedback element 202 are capacitive elements that increase and/or decrease capacitance proportionally in response to the movement of the proof mass 130. The sense element 201 is coupled to a first input 210 and the feedback element 202 is coupled to an output 112 of the amplifier 120. It will be appreciated that the first input 210 may be a voltage input, a reference voltage, a variable voltage, and/or any other suitable input.

In some embodiments, the sense element 201 is coupled to a first input and the feedback element 202 is coupled to the output 112 of the amplifier 120. The sense element 201 and the feedback element 202 have a total capacitance defined by the equation:

$$C_0 = \frac{\varepsilon_0 A}{g} \quad (5)$$

where A is the total area of overlap of the sense element 201 and the proof mass 130 plus the total area of overlap of the feedback element 202 and the proof mass 130 (e.g., the area of overlap between the proof mass 130 and the first sense element 101 before the first sense element 101 is divided between the sense element 201 and the feedback element 202), g is initial (or zero) position gap between the sense element 201 and the feedback element 202 and the proof mass 130, and $\varepsilon_0$ is the permittivity of the space between proof mass 130 and the elements 201, 202. The total capacitance $C_0$ is split between the sense element 201 and the feedback element 202. In some embodiments, the sense element 201 and the feedback element 202 are physically separate elements each having an area defining a portion of the total capacitance $C_0$. In other embodiments, the sense element 201 and the feedback element 202 are portions of a single element. Movement of the proof mass 130 changes the capacitance of the sense element 201 and the feedback element 202. The capacitance of the sense element 201 ($C_{201}$) can be defined by the equation:

$$C_{201} = \frac{\alpha C_0}{1 - x/g} \quad (6)$$

where $\alpha$ is the percentage of the total capacitance $C_0$ of the sense element 201 and has a value $0 \leq \alpha \leq 1$ and x is the displacement of the proof mass 130. Similarly, the capacitance of the feedback element 202 ($C_{202}$) can be defined by the equation:

$$C_{202} = \frac{(1 - \alpha)C_0}{1 - x/g} \quad (7)$$

The ratio of the total capacitance $C_0$ between the sense element 201 and the feedback element 202 can be any suitable ratio, such as, for example, 95/5, 90/10, 80/20, 70/30, and/or any other suitable ratio. In some embodiments, the ratio between the sense element 201 and the feedback element 202 determines the amplification of the amplifier 120. In embodiments omitting the feedback element 202, the gain of the amplifier is limited, as the signal-to-noise ratio of the amplifier 120 is increased.

In some embodiments, a reference element 203 is coupled between the anchor 132 and a second input 211. It will be appreciated that the second input 211 may be a voltage input, a reference voltage, a variable voltage, and/or any other suitable input. It will be further appreciated that the second reference element may be an electrode of a capacitor, a capacitor, a piezoelectric element, piezoresistive element, and/or any other suitable sense element. In some embodiments, the reference element 203 has a capacitance substantially equal to the total capacitance of the sense element 201 and the feedback element 202 when the proof mass 130 is in a zero, or non-displaced position. For example, the capacitance of the reference element 203 can be defined by the equation:

$$C_{203} = \alpha C_0 \quad (8)$$

In some embodiments, the second input 211 may be opposite to the first input 210, e.g., it may have a polarity opposite to that if the first input 210. The second input 211 is applied to the fixed anchor 132 by the reference element 203. In some embodiments, the second input 211 is applied to the amplifier 120 via the wire 121. As noted above, in some embodiments, an opposite input is an input having the same magnitude but with an opposite polarity, e.g., a first input of $+V_{in}$ and a second input of $-V_{in}$. It is appreciated that in some embodiments, an opposite input may have a polarity opposite to another input but it may have a different magnitude. As such, the description of the embodiments having opposite polarity and same magnitude is exemplary and should not be construed as limiting the scope of the embodiments. The sense element 201 and the reference element 203 may be arranged in a half-Wheatstone bridge configuration and provide an input to the amplifier 120.

Movement of the proof mass 130 in response to the external stimuli generates a proof mass signal that is provided to the amplifier 120 through the fixed anchor 132. The amplifier 120 generates an output signal 112 in response to the proof mass signal. In some embodiments, the amplifier 120 is a differential amplifier that generates an output 112 based on a difference between the proof mass signal and the second input 211. In other embodiments, the proof mass signal and the second input 211 are combined into a single signal at the anchor 132 and a single input signal is provided to the amplifier 120 via the wire 121. In some embodiments, the proof mass signal and the gain of the amplifier 120 may both be non-linear. The non-linearity of the proof mass signal and the non-linear gain of the amplifier 120 are adjusted such that the non-linearity's cancel out with one and another and generate a linear output signal 112 from the amplifier 120. For example, in some embodiments having the first input 210 equal to a voltage +$V_{in}$ and the second input 211 equal to a voltage of –$V_{in}$, the output 112 ($V_{112}$) of the amplifier 120 is defined by the equation:

$$\frac{V_{112}}{V_{in}} = \frac{\alpha C_0 - \dfrac{\alpha C_0}{1 - x/g}}{\dfrac{(1-\alpha)C_0}{1 - x/g}} = \frac{\alpha}{1-\alpha} \frac{x}{g} \quad (9)$$

As can be seen in the above equation, the output 112 is linearly dependent on the displacement, x, of the proof mass 130 and does not include any higher order polynomials like equation (4). In some embodiments, the scale factor of the amplification of the amplifier 120 is determined by the value α, e.g., the ratio of the total capacitance $C_0$ of the sense element 201 (e.g., the ratio of the area of the sense element 201 in comparison to the area of a first sense element 101 having an area equal to the area of a side of the proof mass 130). As α approaches 1, the amplification of the amplifier 120 approaches infinity. For example, if the area of the sense element 201 is 40% of the area of side of the proof mass 130, then α=0.4. The remaining percentage (e.g., 1-α) is the ratio of the area of the feedback element 202 in comparison to the area of the side of the proof mass 130. For example, where the sense element 201 is 40% of the area of the side of the proof mass 130, the remaining percentage, 0.6, is the ratio of the area of the feedback element 202 to the area of the proof mass 130.

By eliminating the second sense element 102 and providing a sense element 201 and feedback element 202 on a first side of the proof mass 130, the MEMS sensor 200 provides advantages over the MEMS sensor 100. The MEMS sensor 200 has a smaller profile and simpler structure, as sense elements are formed only on a single side of the proof mass 130. Eliminating the negative electrode (e.g., the second sense element 102) also provides extra space allowing for an increase in sensitivity of the MEMS sensor 200 compared to the MEMS sensor 100. MEMS sensor 100 is limited by a non-linear response and only allows displacement of the proof mass 130 of approximately 10% of the gap distance g. In contrast, the MEMS sensor 200 theoretically allows displacement of the proof mass 130 to 100% of the gap distance g, allowing greater sensitivity and larger sensing ranges for the MEMS sensor 200.

Using the capacitive detection scheme describe by equation (9) for a MEMS microphone may eliminate the total harmonic distortion, enabling the MEMS microphone to perform with improved quality at large sound levels. The embodiments described herein are advantageous over the prior art microphones because the prior art microphones use single sided sensing described by equation (1) and the $x^2$ term dominates the total harmonic distortion whereas the embodiments described herein eliminate the harmonic distortion and provide a superior quality and performance.

The MEMS sensor 200 can be configured as any suitable MEMS sensor for detecting one or more environmental stimuli. For example, in various embodiments, the MEMS sensor 200 is configured as a barometer, a magnetometer, an accelerometer, a gyroscope, a microphone, and/or any other suitable MEMS sensor. Although embodiments discussed herein having a single proof mass 130, it will be appreciated that the MEMS sensor 200 can include multiple proof masses, each having associated sense elements 201, feedback elements 202, and/or reference elements 203.

Figure 3:
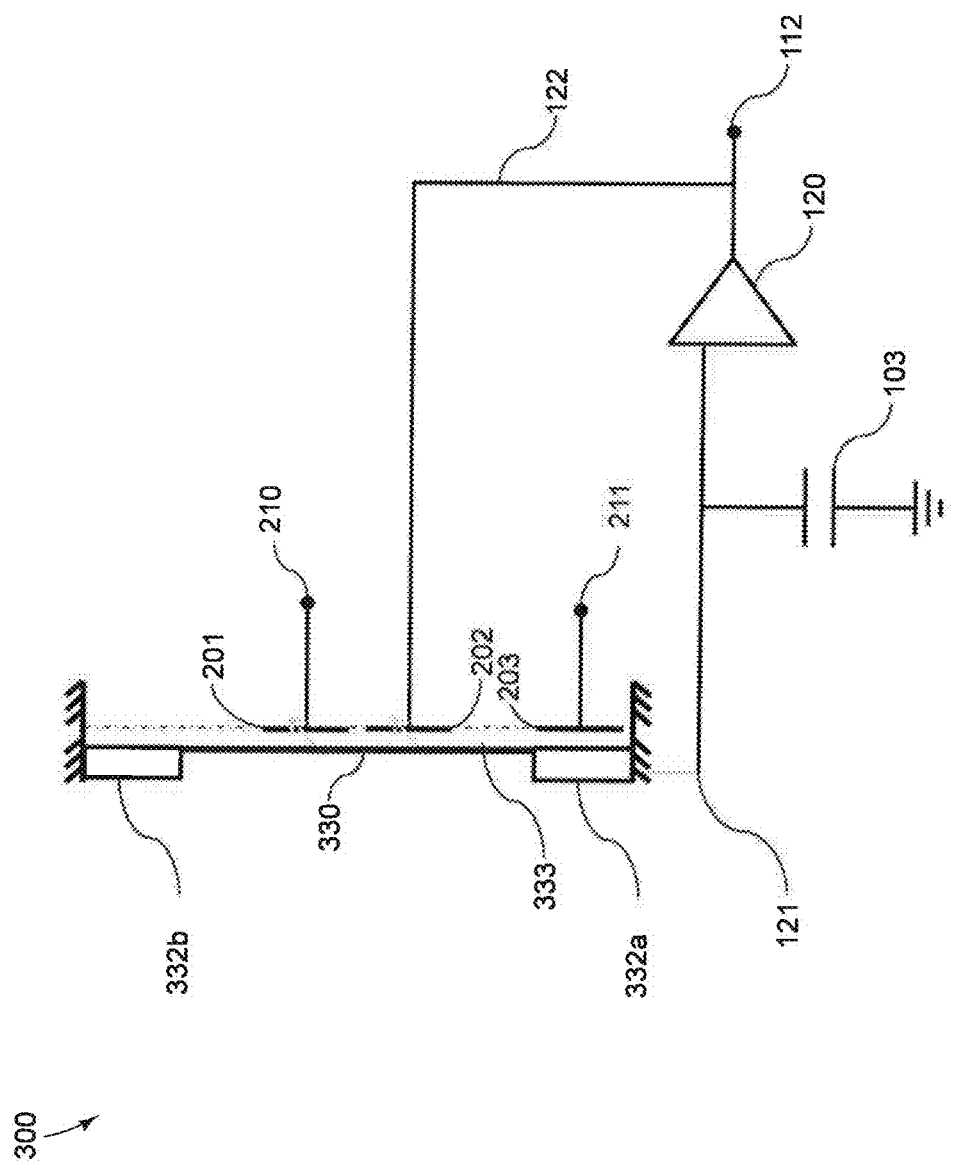
FIG. 3 shows a MEMS sensor with a membrane, in accordance with some embodiments.

FIG. 3 illustrates one embodiment of a MEMS sensor 300 having a linear proof mass 330. The linear proof mass 330 may be a MEMS mass. The linear proof mass 330 is coupled to a first anchor 332a and a second anchor 332b. In some embodiments, the proof mass 330 comprise a flexible membrane that is configured to deflect with respect to the sense element 201 and the feedback element 202. The flexible membrane can deflect into a cavity 333. In other embodiments, the proof mass 330 is a rigid linear element. The proof mass 330 is configured to move in response to ambient pressure and/or pressure changes. Movement of the proof mass 330 changes the capacitance of the sense element 201 and the feedback element 202. The sense element 201 is coupled to an input 210 and the feedback element 202 is coupled to the output 112 of the amplifier 120, as described above with respect to FIG. 2. The output 112 is generated similar to the output 112 discussed above with respect to FIG. 1, and similar description is not repeated herein. In some embodiments, the MEMS sensor 300 is configured as a barometer. In other embodiments, the MEMS sensor 300 is configured as a microphone.

Figure 4:
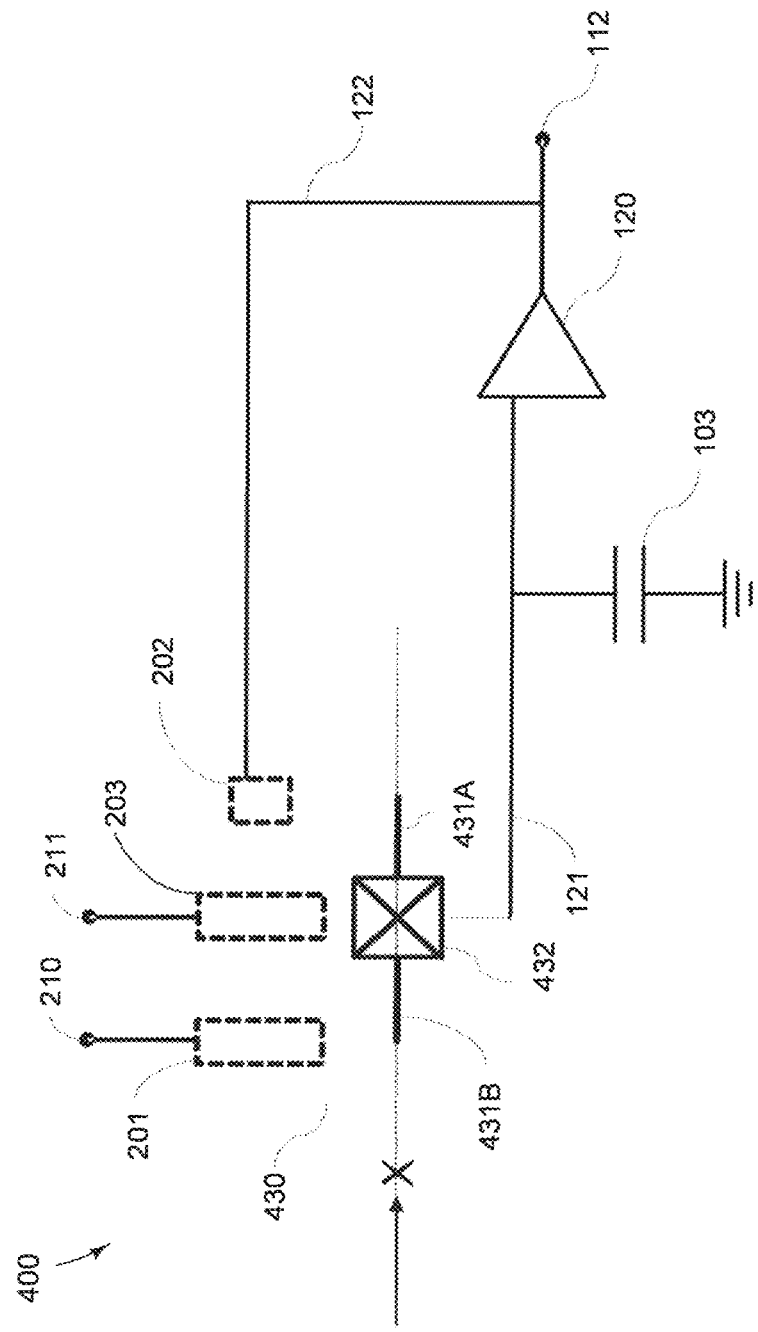
FIG. 4 shows a MEMS sensor with a rotating proof mass, in accordance with some embodiments.

FIG. 4 illustrates one embodiment of a MEMS sensor 400 having an out-of-plane rotational proof mass 430. The rotational proof mass 430 may be a MEMS mass. The rotational proof mass 430 is coupled to an anchor 432 by a first spring 431a and a second spring 431b. The rotational proof mass 430 rotates out-of-plane about the x axis around the center portion coupled directly to the anchor 432. In some embodiments, the sense element 201 and the feedback element 202 are coupled to a portion of the rotational proof mass 430. In other embodiments, the rotational proof mass 430 comprises a rotating electrode having a predetermined portion, α, configured as a sense element and a remaining portion (1-α) configured as a feedback element 202. The rotational proof mass 430 is configured to rotate out-of-plane of FIG. 4. Rotation of the rotational proof mass 430 causes a change in capacitance of the sense element 201 and the feedback element 202. The reference element 203 is positioned to apply a second input 211 to the anchor 432. The anchor 432 applies the second input 211 to the amplifier 120 via the wire 121. In some embodiments, the anchor 432 applies a composite signal generated by combining the proof mass signal and the second input 211.

Figure 5:
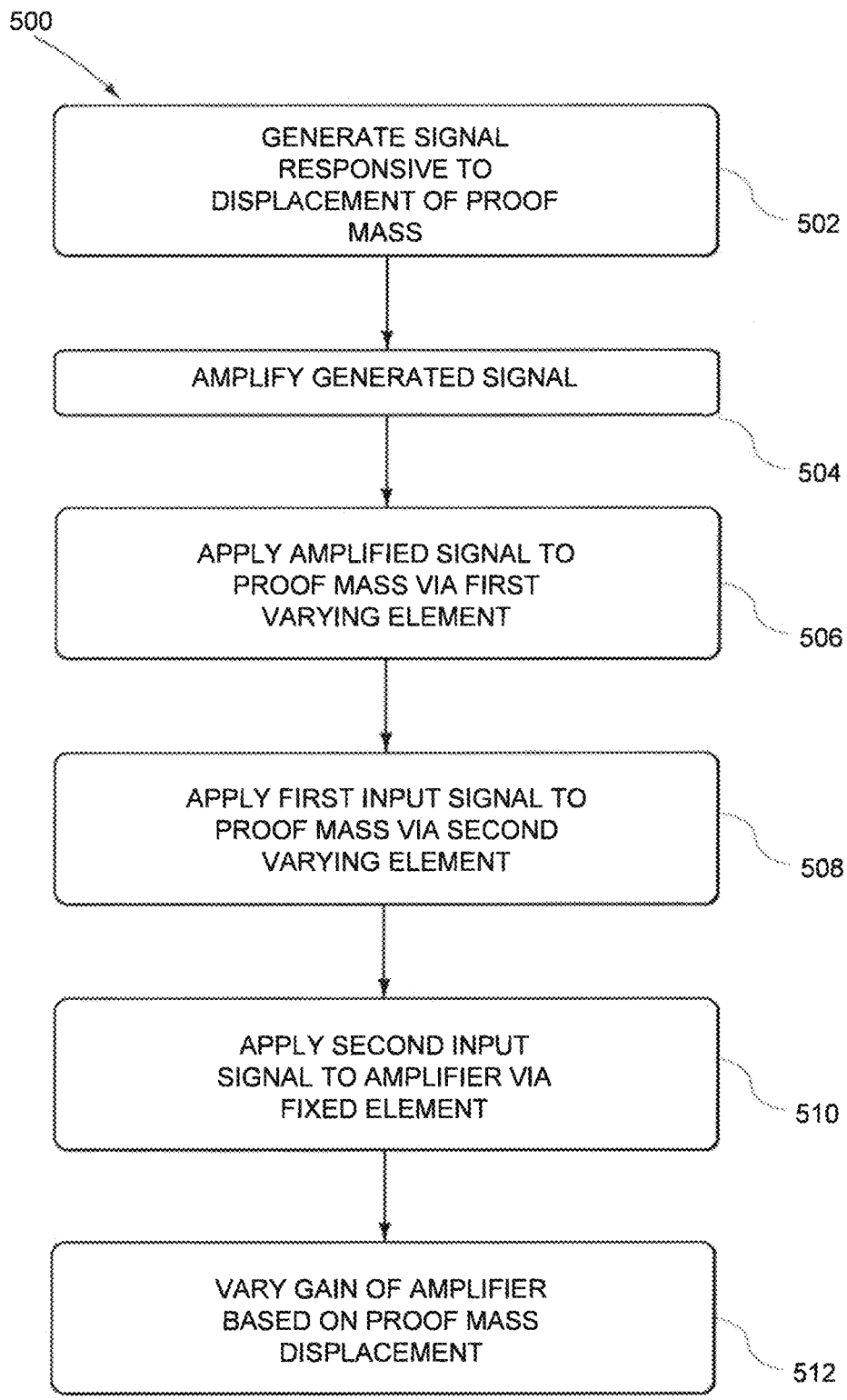
FIG. 5 shows a method of detecting an environmental condition, in accordance with some embodiments.

With reference to FIGS. 2-4, a method 500 of sensing one or more environmental factors is disclosed shown in FIG. 5. At 502, a signal, such as a proof mass signal, is generated in response to displacement of a proof mass 130. The proof mass 130 can be displaced by one or more environmental factors, such as, for example, acceleration, magnetic field, pressure, Coriolis force, acoustic pressure, piezoelectric force, electrostatic force, and/or any other suitable external stimuli or combination thereof. At step 504, the proof mass signal is amplified by an amplifier 120. The amplified proof mass signal is provided to a first varying element and applied back to the proof mass 130 at step 506. In some embodiments, the first varying element is a feedback element 202. The feedback element 202 can comprise any suitable varying element, such as, for example, a variable capacitor, a piezoelectric element, piezoresistive element, and/or any other suitable varying element. The feedback element 202 can be spaced apart from and/or integral with the proof mass 130. At step 508, a first input signal is applied to the proof mass 130 via a second varying element, such as the sense element 201. The sense element 201 can comprise any suitable varying element, such as, for example, a variable capacitor, a piezoelectric element, piezoresistive element, and/or any other suitable varying element. The sense element 201 can be spaced apart from and/or integral with the proof mass 130.

In some embodiments, a second input signal 211 is applied to the amplifier via a fixed element, such as a reference element 203 at step 510. The reference element 203 can be spaced apart from and/or coupled to an anchor 132. The gain of the amplifier 120 is varied based on the displacement of the proof mass 130 at step 512. The varying gain of the amplifier 120 effects the output 112 of the amplifier 120. The amplifier 120 produces a linear output in response to displacement of the proof mass 130. In some embodiments, the output 112 of the amplifier 120 and the variable gain is governed by equation (9) above.

Figure 6:
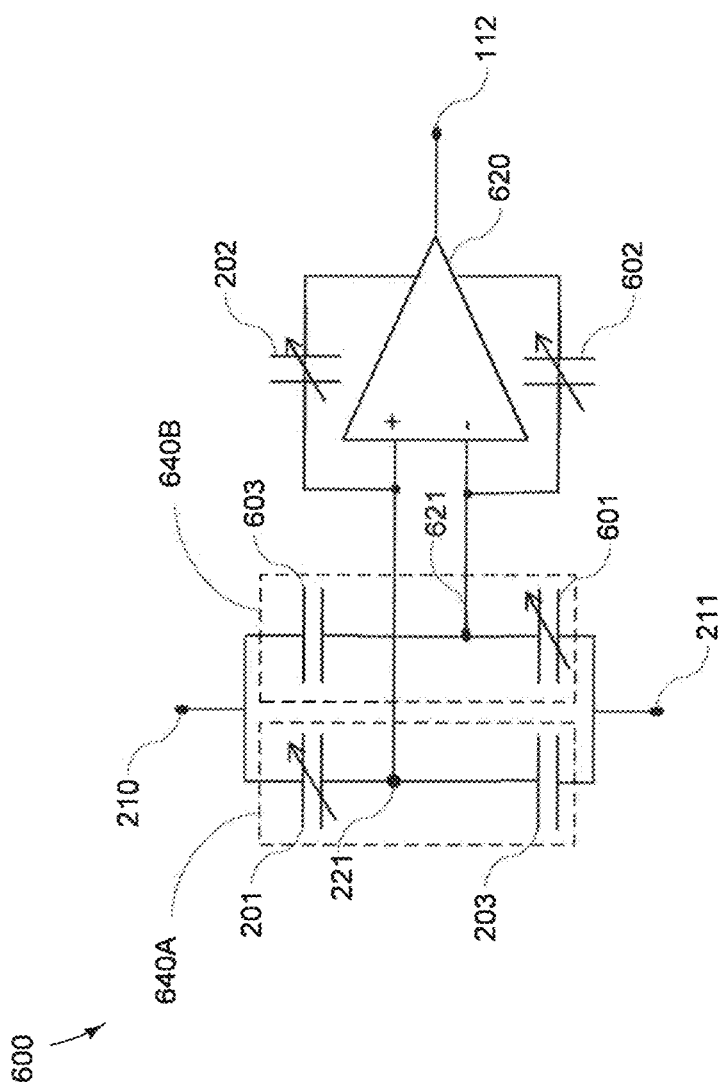
FIG. 6 shows a MEMS sensor with a full-Wheatstone bridge configuration, in accordance with some embodiments.

FIG. 6 illustrates one embodiment of a MEMS sensor 600 having a full-Wheatstone bridge configuration. The MEMS sensor 600 includes a first MEMS sensor 640a including a first sense element 201, a first feedback element 202, and a first reference element 203. The first sense element 201, first feedback element 202, and first reference element 203 operate as described in conjunction with FIGS. 2-4. A second MEMS sensor 640b is coupled in parallel with the first MEMS sensor 640a between the first input 210 and the second input 211. The second MEMS sensor 640b includes a second sense element 601, a second feedback element 602, and a second reference element 603. The second MEMS sensor 640b operates similar to the first MEMS sensor 640a, but provides an input to a negative terminal of an amplifier 620. The first MEMS sensor 640a and the second MEMS sensor 640b form a full-Wheatstone bridge configuration. In some embodiments, the amplifier 620 is an instrumentation amplifier. In some embodiments, the first MEMS sensor 640a and the second MEMS sensor 640b can use the same proof mass 130. In other embodiments, the first MEMS sensor 640a and the second MEMS sensor 640b can each include a proof mass 130.

Figure 7A:
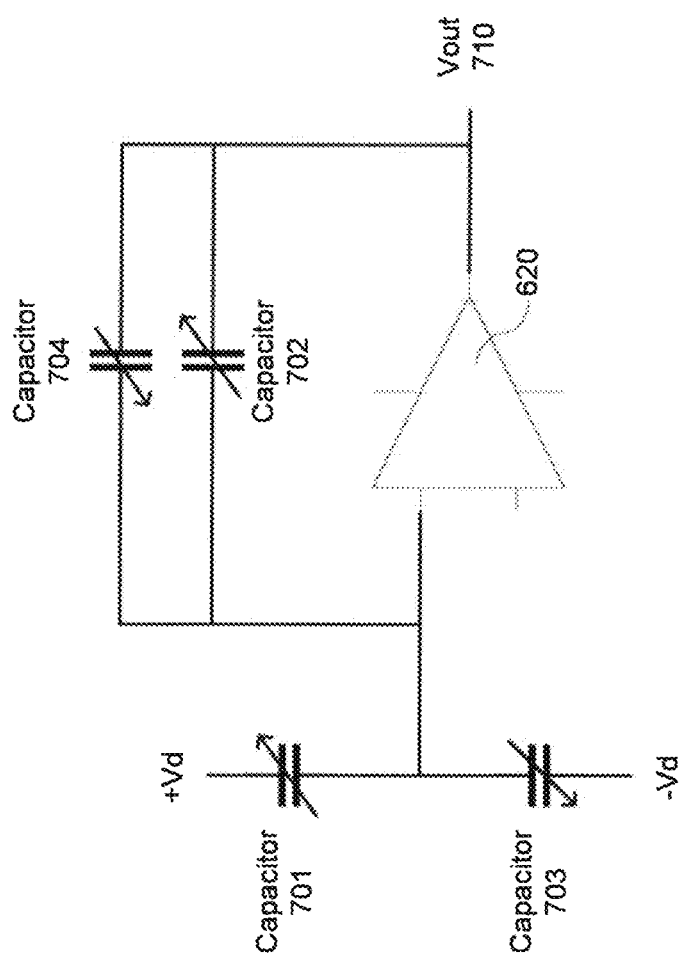
FIGS. 7A and 7B show a dual capacitive linearization circuit for a MEMS sensor and a dual capacitive linearization circuit for a MEMS sensor with switches for changing gain of the amplifier associated therewith, in accordance with some embodiments.

FIG. 7A shows a dual capacitive linearization circuit for a MEMS sensor, in accordance with some embodiments. The capacitive MEMS sensor includes sense elements 701 and 703, and feedback elements 702 and 704. It is appreciated that the sense elements 701 and 703 may each be similar to that as described in FIG. 2 and that the feedback elements 702 and 704 may each be similar to that as described in FIG. 2. In some embodiments, the sense element 701 and the feedback element 702 are located on a first side of the proof mass 130 and the sense element 703 and the feedback element 704 are located on a second side of the proof mass 130. The first side and the second side may be opposite to one another such that the performance of the device remains unaffected even if the radius (distance) between the sense elements and the proof mass are not properly positioned because the feedback elements compensate for the error. It is appreciated that using more than one feedback element may be advantageous to compensate for manufacturing errors that may result in a different radius between the sensing elements and proof mass because each feedback element compensates for the discrepancies of the radii. Furthermore, utilizing more than one feedback element enables flexibility of using different capacitors under different circumstances and modes, e.g., power saving mode, low noise mode, etc. In other words, the feedback elements may be independently switched on/off depending on the mode of operation.

Figure 8A:
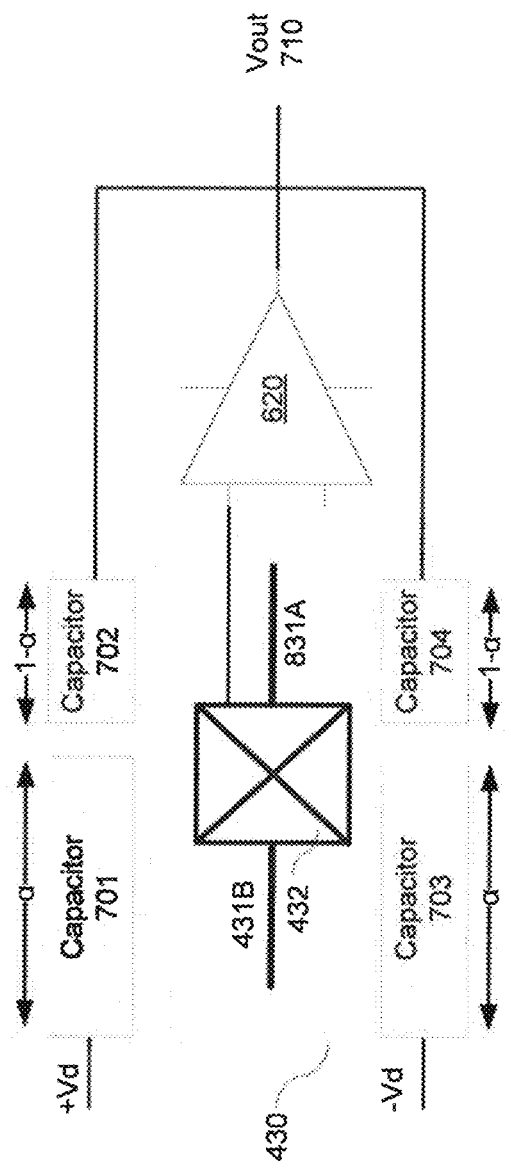
FIGS. 8A-8B show another dual capacitive linearization circuit for a MEMS sensor, in accordance with some embodiments.
Figure 8B:
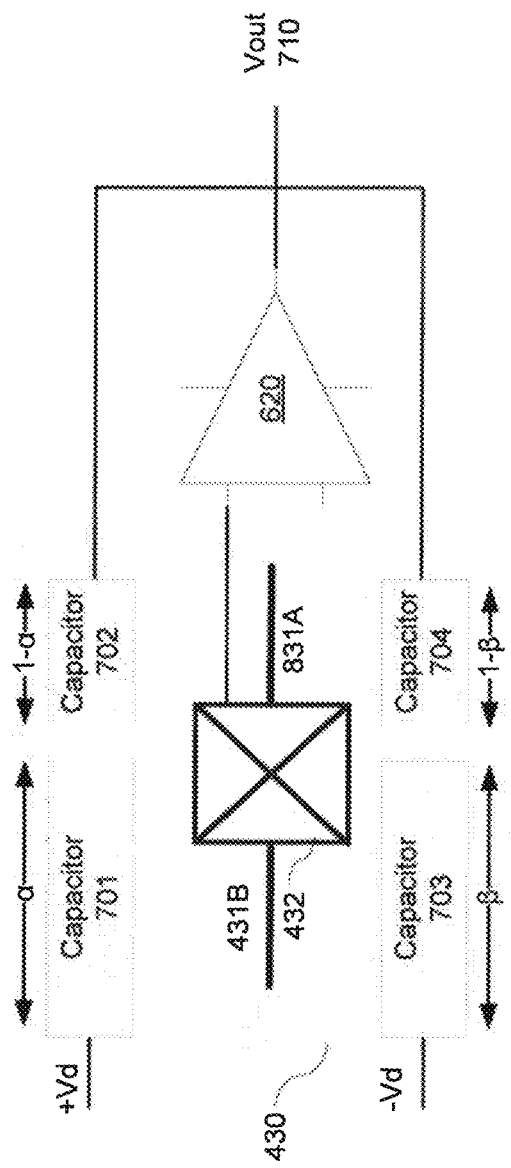

It will be appreciated that the sense element 701 and/or the feedback element 702 may be an electrode of a capacitor, a capacitor, a piezoelectric element, piezoresistive element, and/or any other suitable sense element. It will be appreciated that the sense element 703 and/or the feedback element 704 may be an electrode of a capacitor, a capacitor, a piezoelectric element, piezoresistive element, and/or any other suitable sense element. The first sense element 101 illustrated in FIG. 1 is effectively divided between the sense element 701 and the feedback element 702, as shown in FIG. 8A, and the second sense element similar to 102 is effectively divided between the sense element 703 and the feedback element 704, as shown in FIG. 8B. Displacement of the proof mass 130 changes one or more electrical parameters, such as capacitance, of both the sense element 701 and the feedback element 702 in unison, as well as the sense element 703 and the feedback element 704 in unison.

In some embodiments, the sense element 701 and the feedback element 702 are positioned such that the gap between the sense element 701 and the proof mass 130 is equal to the gap between the feedback element 702 and the proof mass 130 such that the one or more electrical parameters of the sense element 701 and the feedback element 702 change equally and in the same direction in response to displacement of the proof mass 130. For example, in some embodiments, the sense element 701 and the feedback element 702 are capacitive elements that equally increase and/or decrease capacitance in response the movement of the proof mass 130. In some embodiments, the sense element 701 and the feedback element 702 are capacitive elements that increase and/or decrease capacitance proportionally in response to the movement of the proof mass 130. In some embodiments, the sense element 703 and the feedback element 704 are positioned such that the gap between the sense element 703 and the proof mass 130 is equal to the gap between the feedback element 704 and the proof mass 130 such that the one or more electrical parameters of the sense element 703 and the feedback element 704 change equally and in the same direction in response to displacement of the proof mass 130. For example, in some embodiments, the sense element 703 and the feedback element 704 are capacitive elements that equally increase and/or decrease capacitance in response the movement of the proof mass 130. In some embodiments, the sense element 703 and the feedback element 704 are capacitive elements that increase and/or decrease capacitance proportionally in response to the movement of the proof mass 130.

In an embodiment the sense element 701 is coupled to $+V_d$ and the feedback element 702 is coupled to an output of the amplifier 620. The sense element 703 is coupled to $-V_d$ and the feedback element 704 is coupled to an output 710 of the amplifier 620. In other words, the sense elements 701 and 703 are each coupled to an input with a polarity that is opposite to the other. The amplifier 620 may be substantially similar to the one discussed in FIG. 2. It will be appreciated that $+V_d$ and $-V_d$ may be a voltage input, a reference voltage, a variable voltage, and/or any other suitable input.

In some embodiments, the sense element 701 and 703 are coupled to a voltage input that is different in polarity and the feedback elements 702 and 704 are coupled to the output 710 of the amplifier 620. The sense elements 701 and 703, and the feedback elements 702 and 704 each have a capacitance defined by the equation:

$$C_0 = \frac{\varepsilon_0 A}{g} \tag{10}$$

where A is the total area of overlap of the sense elements 701 and 703, and the proof mass 130 plus the total area of overlap of the feedback elements 702 and 704 and the proof mass 130, g is initial (or zero) position gap between the sense elements 701 and 703, and the feedback elements 702 and 704, and the proof mass 130, and $\varepsilon_0$ is the permittivity of the space between proof mass 130 and the elements 701-704. The total capacitance $C_0$ is split between the sense element 701 and the feedback element 702 as well as sense element 703 and the feedback element 704. In some embodiments, the sense element 701 and the feedback element 702 are physically separate elements each having an area defining a portion of the total capacitance $C_0$ and the sense element 703 and the feedback element 704 are physically separate elements each having an area defining a portion of the total capacitance $C_0$. In other embodiments, the sense element 701 and the feedback element 702 are portions of a single element while the sense element 703 and the feedback element 704 are portions of another single element. Movement of the proof mass 130 changes the capacitance of the sense element 701 and the feedback element 702 as well as capacitance of sense element 703 and the feedback element 704. The capacitance of the sense element 701 ($C_{701}$) the sense element 703 ($C_{703}$) can be defined by the equations:

$$C_{701} = \frac{\alpha C_0}{1 - x/g} \tag{11}$$

$$C_{703} = \frac{\alpha C_0}{1 + x/g} \tag{12}$$

where $\alpha$ is the percentage of the total capacitance $C_0$ for each of the sense elements 701 and 703 and has a value $0 \leq \alpha \leq 1$ and x is the displacement of the proof mass 130. Similarly, the capacitance of the feedback elements 702 ($C_{702}$) and 704 ($C_{704}$) can be defined by the equation:

$$C_{702} = \frac{(1 - \alpha)C_0}{1 - x/g} \tag{13}$$

$$C_{704} = \frac{(1 - \alpha)C_0}{1 + x/g}. \tag{14}$$

The ratio of the total capacitance $C_0$ between the sense elements and their respective feedback elements can be any suitable ratio, such as, for example, 95/5, 90/10, 80/20, 70/30, and/or any other suitable ratio. In some embodiments, the ratio between the sense element 701 and the feedback element 702 and further the ratio between the sense element 703 and the feedback element 704 determine the amplification of the amplifier 620.

It is appreciated that the capacitance of the sensing elements 701 and 703 coupled to the input of the amplifier 602 can be defined by the following equation:

$$C_{701} - C_{703} = \frac{\alpha C_0}{1 - x/g} - \frac{\alpha C_0}{1 + x/g} = \frac{2\alpha C_0 x/g}{1 - (x/g)^2}. \tag{15}$$

The capacitance of the feedback elements 702 and 704 coupled to the output of the amplifier 602 can be defined by the following equation:

$$C_{702} + C_{704} = \frac{(1 - \alpha)C_0}{1 - x/g} + \frac{(1 - \alpha)C_0}{1 + x/g} = \frac{2(1 - \alpha)C_0}{1 - (x/g)^2}. \tag{16}$$

Movement of the proof mass 130 in response to the external stimuli, e.g., acceleration, magnetic field, pressure, Coriolis force, acoustic pressure, barometric pressure, piezoelectric force, electrostatic force, etc., generates a proof mass signal that is provided to the amplifier 620 through the fixed anchor 132. The amplifier 620 generates an output signal 710 in response to the proof mass signal. In some embodiments, the amplifier 620 is a differential amplifier, whereas in other embodiments the proof mass signal and the input signal from the sense elements 701 and 703 are combined into a single signal at the anchor 132 and a single input signal is provided to the amplifier 620. In some embodiments, the proof mass signal and the gain of the amplifier 620 may both be non-linear. The non-linearity of the proof mass signal and the non-linear gain of the amplifier 620 are adjusted such that the non-linearity's cancel out with one and another and generate a linear output signal 710 from the amplifier 620. For example, in some embodiments the output 710 ($V_{out}$) of the amplifier 620 is defined by the equation:

$$\frac{V_{out}}{V_d} = \frac{\frac{2\alpha C_0 x/g}{1 - (x/g)^2}}{\frac{2(1 - \alpha)C_0}{1 - (x/g)^2}} = \frac{\alpha}{1 - \alpha} \frac{x}{g}. \tag{17}$$

As can be seen in the above equation, the output 710 is linearly dependent on the displacement, x, of the proof mass 130 and does not include any higher order polynomials like equation (4). In some embodiments, the scale factor of the amplification of the amplifier 620 is determined by the value $\alpha$, e.g., the ratio of the total capacitance $C_0$ of the sense elements 701 and 703. As $\alpha$ approaches 1, the amplification of the amplifier 620 approaches infinity. For example, if the area of the sense element 701 is 40% of the area of side of the proof mass 130, then $\alpha=0.4$. The remaining percentage (e.g., 1-$\alpha$) is the ratio of the area of the feedback element 702 in comparison to the area of the side of the proof mass 130. For example, where the sense element 701 is 40% of the area of the side of the proof mass 130, the remaining percentage, 0.6, is the ratio of the area of the feedback element 702 to the area of the proof mass 130. It is appreciated that the same principle applies to the sense element 703 and its corresponding feedback element 704.

It is appreciated that the distance between the first feedback element, e.g., capacitor 702, and the proof mass, and a distance between the first sense element, e.g., capacitor 701, and the proof mass, change equally and in a same direction in response to proof mass displacement. Similarly, it is appreciated that the distance between the second feedback element, e.g., capacitor 704, and the proof mass, and a distance between the first sense element, e.g., capacitor 703, and the proof mass, change equally and in a same direction in response to proof mass displacement.

It is further appreciated that a capacitance value of the first sense element, e.g., capacitor 701, at substantially zero proof mass displacement and a capacitance value of second sense element, e.g., capacitor 703, at substantially zero proof mass displacement are substantially the same and opposite in polarity. It is appreciated that each sense element and its corresponding feedback element are on a same side of the proof mass while the other sense element and its corresponding feedback element are on another side of the proof mass in one example. It is appreciated that the sense elements and/or the feedback elements may be capacitors, piezoresistors, or any combination thereof.

By adding the second sense element 703 and its feedback element 704 on opposite side of the proof mass 130 as the sense element 701 and feedback element 702, the MEMS sensor described in FIG. 7A provides advantages over the MEMS sensor 100. The MEMS sensor in FIG. 7A allows displacement of the proof mass 130 to 100% of the gap distance g, allowing greater sensitivity and larger sensing ranges for the MEMS sensor. Moreover, using two sense elements and two corresponding feedback elements enables the circuit to correct for manufacturing errors where the radii between one sense element and the proof mass is unequal to the radii between the other sense element and the proof mass. Furthermore, utilizing more than one feedback element enables the flexibility of using different capacitors under different circumstances and modes, e.g., power saving mode, low noise mode, etc. In other words, the feedback elements may be independently switched on/off depending on the mode of operation.

Using the capacitive detection scheme described by equation (17) for a MEMS microphone may eliminate the total harmonic distortion, enabling the MEMS microphone to perform with improved quality at large sound levels. The embodiments described herein are advantageous over the prior art microphones because the prior art microphones use single sided sensing described by equation (1) and the $x^2$ term dominates the total harmonic distortion, whereas the embodiments described herein eliminate the harmonic distortion and provide superior quality and performance. Furthermore, it is appreciated that while the received signal by the amplifier is nonlinear and the gain of the amplifier is nonlinear and based on the feedback elements and the sense elements, the output signal is linear.

Figure 7B:
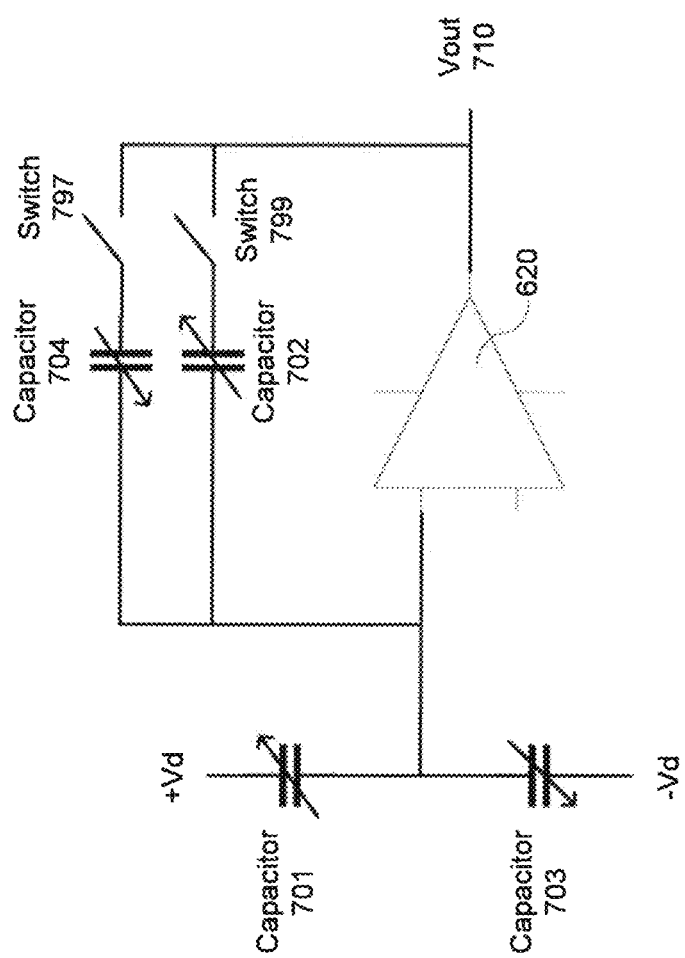

The MEMS sensor can be configured as any suitable MEMS sensor for detecting one or more environmental stimuli. For example, in various embodiments, the MEMS sensor as described in FIG. 7A may be configured as a barometer, a magnetometer, an accelerometer, a gyroscope, a microphone, and/or any other suitable MEMS sensor. Although embodiments discussed herein have a single proof mass 130, it will be appreciated that the MEMS sensor as described in FIG. 7A can include multiple proof masses, each having associated sense elements 701 and 703 and feedback elements 702 and 704. For example, a second proof mass, a second spring, a third sense element and a third feedback element may be used similarly to the first and second sense/feedback elements. It is appreciated that switches 797 and 799, as shown in FIG. 7B, may be positioned in series with capacitors 702 and 704, respectively, thereby turning the changes made to the gain of the amplifier 620 on/off.

FIGS. 8A-8B show another dual capacitive linearization circuit for a MEMS sensor, in accordance with some embodiments. Referring specifically to FIG. 8A, a MEMS sensor having an out-of-plane rotational proof mass 430 is shown. The rotational proof mass 430 may be a MEMS mass. The rotational proof mass 430 is coupled to an anchor 432 by a first spring 831a and a second spring 431b. The rotational proof mass 430 rotates out-of-plane about the x axis around the center portion coupled directly to the anchor 432. In some embodiments, the sense element 701 and the feedback element 702 are coupled to a portion of the rotational proof mass 430 and the sense element 703 and the feedback element 704 are coupled to another portion of the rotational proof mass 430. In other embodiments, the rotational proof mass 430 comprises a rotating electrode having a predetermined portion, a, configured as sense elements 701 and 703, and a remaining portion (1-α) configured as feedback elements 702 and 704. The rotational proof mass 430 is configured to rotate out-of-plane of FIG. 8A. Rotation of the rotational proof mass 430 causes a change in capacitance of the sense elements 701 and 703 and the feedback elements 702 and 704. The anchor 432 applies the input signal to the amplifier 620. FIG. 8B is substantially similar to that of FIG. 8A except that the proportion of the sense element 701 to the feedback element 702 is different from the proportion of the sense element 703 to the feedback element 704. In other words, the ratio for one is determined by a and for the other is determined by β.

Figure 9:
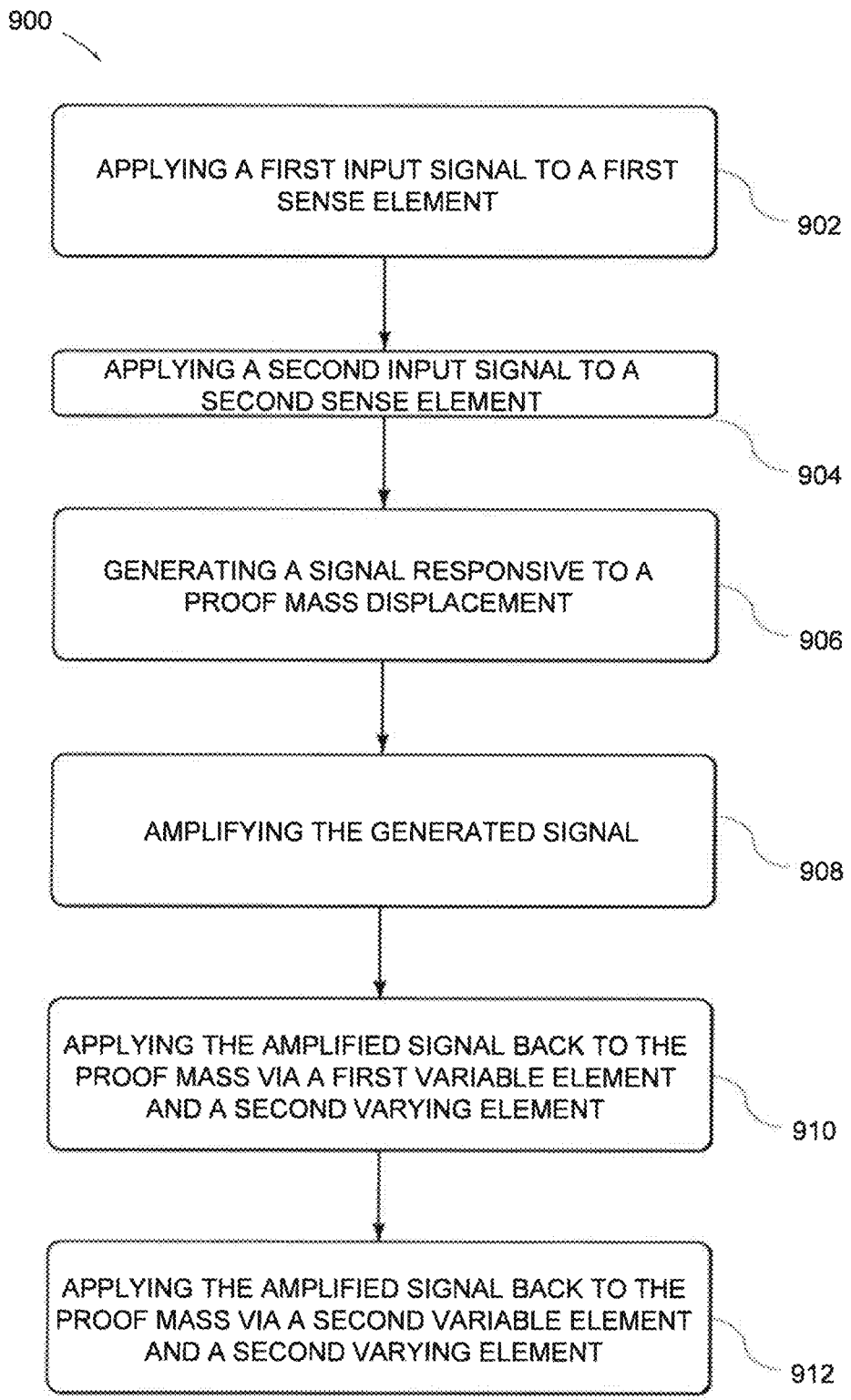
FIG. 9 shows a method of detecting an environmental condition with a dual capacitive linearization circuit of a MEMS sensor, in accordance with some embodiments.

FIG. 9 shows a method 900 of detecting an environmental condition with a dual capacitive linearization circuit of a MEMS sensor, in accordance with some embodiments. With reference to FIGS. 7-8B, a method 900 of sensing one or more environmental factors is disclosed shown in FIG. 9. At 902, a first input signal, e.g., $+V_d$, is applied to a first sense element and at step 904, a second input signal, e.g., $-V_d$, is applied to a second sense element. The output of the first sense element and the second sense elements are connected to one another, as shown in FIGS. 7-8B. At step 906, a signal, such as a proof mass signal, is generated via a first and a second sense element, in response to displacement of a proof mass 130. The proof mass 130 can be displaced by one or more environmental factors, such as, for example, acceleration, magnetic field, pressure, Coriolis force, acoustic pressure, piezoelectric force, electrostatic force, and/or any other suitable external stimuli or combination thereof.

At step 908, the generated signal is amplified by an amplifier 620. The amplified signal is provided to a first varying element and the second varying element and applied back to the proof mass 130, at steps 910 and 912. In some embodiments, the first varying element and the second varying element are feedback elements 702 and 704. The feedback elements 702 and 704 can comprise any suitable varying element, such as, for example, a variable capacitor, a piezoelectric element, piezoresistive element, and/or any other suitable varying element. The feedback element 702 and 704 can be spaced apart from and/or integral with the proof mass 130.

The gain of the amplifier 620 is varied based on the displacement of the proof mass 130. The varying gain of the amplifier 620 effects the output 710 of the amplifier 620. The amplifier 620 produces a linear output in response to displacement of the proof mass 130. In some embodiments, the output 710 of the amplifier 620 and the variable gain is governed by equation (17) above.

It is appreciated that in some embodiments a distance between the first varying element and the proof mass and a distance between the first sense element and the proof mass change equally and in a same direction, as the proof mass is displaced responsive to a stimuli. Similarly, it is appreciated that a distance between the second varying element and the proof mass and a distance between the second sense element and the proof mass change equally and in a same direction, as the proof mass is displaced responsive to a stimuli. The stimuli may be acceleration, magnetic field, pressure, Coriolis force, acoustic pressure, barometric pressure, piezoelectric force, and electrostatic force. It is appreciated that the varying elements may be piezoresistors and/or capacitors. Furthermore, it is appreciated that while the gain and the generated signal by the amplifier are non-linear, the amplified signal is linear.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A micro-electro-mechanical system comprising:
   a proof mass configured to move in response to a stimulus;
   an anchor coupled to the proof mass via a spring;
   an amplifier configured to receive a proof mass signal from the proof mass via the spring and the anchor, wherein the amplifier is configured to amplify the received proof mass signal to generate an output signal;
   a first sense element connected between the proof mass and a first input signal;
   a second sense element connected between the proof mass and a second input signal, wherein the second input signal has a polarity opposite to the first input signal;
   a first feedback element connected between the proof mass and the output signal, wherein the first feedback element generates a first feedback signal in response to proof mass displacement; and
   a second feedback element connected between the proof mass and the output signal, wherein the second feedback element generates a second feedback signal in response to proof mass displacement,
   wherein a gain of the first amplifier is based on the first and the second feedback elements and further based on the first and the second sense elements, and wherein the gain is non-linear, and wherein received signal at the amplifier, from the anchor, is non-linear, and wherein the output signal is linear.

2. The micro-electro-mechanical system as described in claim 1, wherein a distance between the first feedback element and the proof mass, and a distance between the first sense element and the proof mass, change equally and in a same direction in response to proof mass displacement.

3. The micro-electro-mechanical system as described in claim 1, wherein a capacitance value of the first sense element at substantially zero proof mass displacement and a capacitance value of the second sense element at substantially zero proof mass displacement are substantially the same.

4. The micro-electro-mechanical system as described in claim 3, wherein a gain of the amplifier is a ratio of sum of the first and the second sense elements to sum of the first and the second feedback elements.

5. The micro-electro-mechanical system as described in claim 1, wherein the first sense element and the first feedback element are on a same side of the proof mass and wherein the second sense element and the second feedback element are on another side of the proof mass.

6. The micro-electro-mechanical system as described in claim 1, wherein the stimulus is one of acceleration, magnetic field, pressure, Coriolis force, acoustic pressure, barometric pressure, piezoelectric force, or electrostatic force.

7. The micro-electro-mechanical system as described in claim 1, wherein the first and the second feedback elements, and the first and the second sense elements are piezoresistors.

8. The micro-electro-mechanical system as described in claim 1, wherein the first and the second feedback elements, and the first and the second sense elements are capacitors.

9. The micro-electro-mechanical system as described in claim 1 further comprising:
   a second proof mass configured to move in response to the stimulus;
   a second anchor coupled to the second proof mass via a second spring;
   the amplifier configured to further receive a second proof mass signal from the second proof mass via the second spring and the second anchor, wherein the amplifier is configured to amplify the received proof mass signal and second proof mass signal to generate the output signal;
   a third sense element connected between the second proof mass and the second input signal; and
   a third feedback element connected between the second proof mass and the output signal, wherein the third feedback element generates a third feedback signal in response to the second proof mass displacement.

10. The micro-electro-mechanical system as described in claim 1, wherein a distance between the second feedback element and the proof mass, and a distance between the second sense element and the proof mass, change equally and in a same direction in response to proof mass displacement.

11. A method comprising:
    applying a first input signal to a first sense element;
    applying a second input signal to a second sense element, wherein an output of the second sense element is coupled to an output of the first sense element;
    generating a signal, via the first sense element and the second sense element, responsive to a proof mass displacement;
    amplifying the generated signal via an amplifier;
    applying the amplified signal back to the proof mass via a first variable element and a second varying element; and
    varying a gain of the amplifier based on the proof mass displacement, wherein the gain is non-linear and wherein the generated signal received by the amplifier is non-linear and wherein the amplified signal is linear.

12. The method as described by claim 11, wherein a distance between the first varying element and the proof mass and a distance between the first sense element and the proof mass change equally and in a same direction in response to displacement of the proof mass.

13. The method as described in claim 11, wherein a distance between the second varying element and the proof mass, and a distance between the second sense element and the proof mass, change equally and in a same direction in response to proof mass displacement.

14. The method as described by claim 11, wherein the signal is generated responsive to a stimulus wherein the stimulus is one of acceleration, magnetic field, pressure, Coriolis force, acoustic pressure, barometric pressure, piezoelectric force, or electrostatic force.

15. The method as described by claim 11, wherein the first and second varying elements are piezoresistors.

16. The method as described by claim 11, wherein the first and second varying elements are variable capacitors.

17. A device comprising:
a micro-electro-mechanical system (MEMS) device configured to generate an output signal responsive to a stimulus, wherein the output signal is generated in response to a displacement associated with a component within the MEMS device;
a first capacitor configured to change charges stored thereon responsive to the displacement associated with the component within the MEMS device;
a second capacitor configured to change charges stored thereon in response to the displacement associated with the component within the MEMS device, wherein charges on the first capacitor have a different polarity than charges on the second capacitor;
an amplifier configured to receive an input signal generated by the first capacitor and the second capacitor via the MEMS device, wherein the amplifier is configured to amplify the input signal to generate the output signal;
a third capacitor connected between an output of the amplifier and an input of the amplifier that receives the input signal generated by the first capacitor and the second capacitor, wherein charges on the third capacitor changes in response to the displacement; and
a fourth capacitor connected between the output of the amplifier and the input of the amplifier that receives the input signal generated by the first capacitor and the second capacitor, wherein charges on the fourth capacitor changes in response to the displacement,
wherein a gain of the amplifier is based on the first capacitor, the second capacitor, the third capacitor, and the fourth capacitor, and wherein the gain is non-linear and wherein the input signal at the amplifier is non-linear and wherein the output signal is linear.

18. The device as described in claim 17, wherein the capacitance of the first capacitor and the capacitance of the third capacitor change equally and in a same direction responsive to the displacement associated with the component within the MEMS device.

19. The device as described in claim 17, wherein the capacitance of the second capacitor and the capacitance of the fourth capacitor change equally and in a same direction responsive to the displacement associated with the component within the MEMS device.

20. The device as described in claim 17, wherein the stimulus is one of acceleration, magnetic field, pressure, Coriolis force, acoustic pressure, barometric pressure, piezoelectric force, or electrostatic force.

21. The device as described in claim 17, wherein the MEMS device is a rotational MEMS.

22. The device as described in claim 17, wherein the MEMS device is one of a barometer accelerometer, magnetometer, gyroscope or microphone.

23. The device as described in claim 17 further comprising:
a fifth capacitor in series with a first switch connected between the output of the amplifier and the input of the amplifier that receives the input signal generated by the first capacitor and the second capacitor, wherein charges on the fifth capacitor change in response to the displacement, and wherein the fifth capacitor and the third capacitor are feedback elements associated with the first capacitor wherein the first switch is configured to change the gain of the amplifier.

24. The device as described in claim 23 further comprising:
a sixth capacitor in series with a second switch connected between the output of the amplifier and the input of the amplifier that receives the input signal generated by the first capacitor and the second capacitor, wherein charges on the six capacitor change in response to the displacement, and wherein the sixth capacitor and the fourth capacitor are feedback elements associated with the second capacitor wherein the second switch is configured to include or remove the sixth capacitor to change the gain of the amplifier.

* * * * *